(12) United States Patent
Hackner

(10) Patent No.: US 10,814,808 B2
(45) Date of Patent: Oct. 27, 2020

(54) ELECTRICAL ENERGY SYSTEM FOR A MOTOR VEHICLE

(71) Applicant: AUDI AG, Ingolstadt (DE)

(72) Inventor: Stefan Hackner, Greding (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/582,369

(22) Filed: Sep. 25, 2019

(65) Prior Publication Data

US 2020/0139909 A1    May 7, 2020

(30) Foreign Application Priority Data

Nov. 7, 2018 (DE) .......................... 10 2018 127 785

(51) Int. Cl.
| | | |
|---|---|---|
| *B60R 16/033* | (2006.01) | |
| *H02J 7/00* | (2006.01) | |
| *B60L 50/60* | (2019.01) | |

(52) U.S. Cl.
CPC ............ *B60R 16/033* (2013.01); *B60L 50/60* (2019.02); *H02J 7/0068* (2013.01)

(58) Field of Classification Search
CPC ......... B60R 16/033; B60R 7/00; B60L 50/60; H02J 7/0068
See application file for complete search history.

(56) References Cited

FOREIGN PATENT DOCUMENTS

| | | |
|---|---|---|
| DE | 102009002018 A1 | 10/2010 |
| DE | 102011050719 A1 | 12/2012 |
| DE | 102014002819 A1 | 8/2015 |
| DE | 102017011721 A1 | 5/2018 |
| WO | 2009/047129 A1 | 4/2009 |

OTHER PUBLICATIONS

German Examination Report dated Aug. 21, 2019 in corresponding German Application No. 10 2018 127 785.7; 20 pages.

*Primary Examiner* — Robert L Deberadinis
(74) *Attorney, Agent, or Firm* — Maier & Maier, PLLC

(57) ABSTRACT

The disclosure relates to an electrical energy system for a motor vehicle and a method for operating an electrical energy system for a motor vehicle.

20 Claims, 1 Drawing Sheet

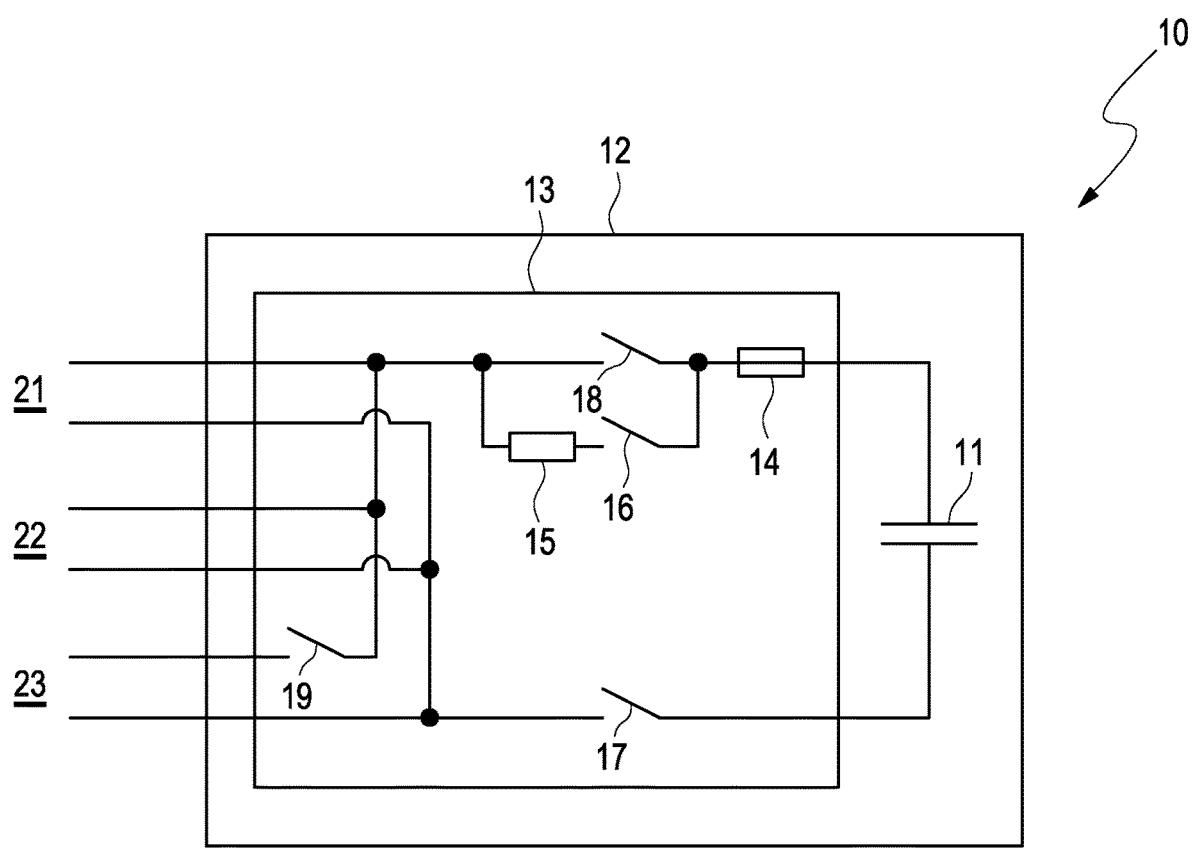

ELECTRICAL ENERGY SYSTEM FOR A MOTOR VEHICLE

FIELD

The disclosure relates to an electrical energy system for a motor vehicle and a method for operating an electrical energy system for a motor vehicle.

BACKGROUND

Electrically driven motor vehicles typically use high-voltage batteries to provide the electrical energy required for operating the propulsion motors. In the case of an accident of the vehicle ("crash"), it must be ensured that no dangerous voltages, which could injure the vehicle occupants, are applied to exposed vehicle parts. For this purpose, a high-voltage battery can be connected via contactors to the intermediate circuit (traction circuit) of the vehicle, to which the electrical loads are connected, wherein said battery is disconnected when an accident occurs.

For example, DE 10 2017 011 721 A1 discloses an electrical wiring system for a motor vehicle, which comprises an intermediate circuit in which electrical component are arranged which can be separated from the intermediate circuit via a contactor.

An electric circuit for disconnecting batteries also is known from DE 10 2009 002 018 A1. A motor vehicle has a battery which is connected to a plurality of loads and which is disconnected from the same via a contactor.

No short circuit may occur in the high-voltage wiring system before the contactors of the high-voltage battery are opened, thereby bringing the potential of the wiring system to zero. The detection of a crash and the opening of the contactor typically takes approximately 20 ms-50 ms. During this time, a portion of the vehicle will be deformed. The installation space in the vehicle that is protected against deformation in case of an accident is limited and not large enough to hold all high-voltage loads of the vehicle. High-voltage loads may not be installed in an installation space of the vehicle that can be deformed during an accident, or they must be protected against deformation with additional measures, for example by protective armor. This solution is expensive and increases the total weight of the vehicle, which reduces the range of the vehicle and its ability to accelerate.

The problem underlying the present invention is to provide devices and methods which at least partially eliminate the disadvantages of the state of the art.

A three-phase AC motor drive circuit of a vehicle, which is capable of operating in emergency mode, is known from DE 10 2011 050 719 A1, said circuit comprising two intermediate circuits, wherein one of the intermediate circuits can be disconnected from a battery via a contactor in order to disengage a motor while driving in case of failure.

SUMMARY

According to the invention, high-voltage loads which are not needed while driving, such as a charging device, are switched off via an additional contactor. These loads can be installed in an installation space that is not crash-protected, as they always carry zero potential during driving operations.

An object of the invention is an energy system for a vehicle. The energy system comprises at least one high-voltage energy storage device arranged in a housing, wherein a unit is arranged in the housing which electrically connects the at least one high-voltage energy storage device with loads connected to the energy system. The unit comprises switching devices which are designed to interrupt the circuit between the at least one high-voltage energy storage device and the loads. According to the invention, at least one load in the energy system, which load is not active during driving operations of the vehicle, is connected with the at least one high-voltage energy storage device via a separate intermediate circuit in the unit, which contains at least one additional switching device. The at least one additional switching device is designed to keep the separate intermediate circuit interrupted constantly during the driving operations.

The energy system comprises at least one high-voltage energy storage device arranged in a housing. This could be a high-voltage battery, for example.

The housing containing the energy storage device ("battery housing") is protected against being deformed during an accident of the vehicle. For this purpose, it could, for example, be arranged in a specially reinforced area of the vehicle ("crash-protected installation space") or, alternatively or additionally, could be protected against deformation through armoring measures.

A unit is arranged in the housing, which electrically connects the at least one high-voltage energy storage device with loads connected to the energy system. This unit also is referred to as a "Battery Junction Box" (BJB). By arranging said BJB in the battery housing, it, too, is protected against deformation occurring as a consequence of an accident of the vehicle.

The BJB comprises switching devices which are designed to interrupt the circuit between the at least one high-voltage energy storage device and the loads. This is necessary in case of an accident to separate the high-voltage energy storage device from the wiring system of the vehicle, such that no dangerous high voltage potentials are applied to exposed vehicle parts, or, correspondingly, no dangerous currents can flow through said parts. In one embodiment of the energy system, the switching devices comprise contactors. The contactors close the high-voltage circuit of the vehicle during driving operations, such that high-voltage loads connected to the high-voltage circuit ("traction circuit"), such as electric motors, can be supplied with electrical energy from the high-voltage energy storage device. The normally open contacts of the contactor are open in their normal position and closed in their activated position ("make contact").

According to the invention, at least one load which is not active during driving operations of the vehicle is connected with the at least one high-voltage energy storage device via a separate intermediate circuit in the unit, which contains at least one additional switching device. The at least one additional switching device is designed to keep the separate intermediate circuit interrupted constantly during driving operations of the vehicle. In one embodiment, the at least one load is a charging device for charging the at least one high-voltage energy storage device from an external power source, such as a charging station. In one embodiment, the at least one switching device comprises at least one contactor. The at least one contactor is mounted in the battery housing, immediately at the exit toward the charging device. The contactor is closed during charging operations; it is always open during driving operations. The normally open contacts of the at least one contactor are open in their normal position and closed in their activated position ("make contact"). In one embodiment, the at least one contactor has only normally open contacts.

In one embodiment of the energy system, the separate intermediate circuit in the unit arranged in the housing (the BJB) comprises a pre-charging circuit, which is designed to bridge the additional switching device before the additional switching device is closed. The separate intermediate circuit therefore has its own pre-charging system to close the at least one contactor without load.

In another embodiment of the energy system, the separate intermediate circuit in the BJB comprises a discharging device, which is designed to discharge the separate intermediate circuit after the additional switching device is opened. The separate intermediate circuit has an active discharging system to discharge the intermediate circuit after the contactor is opened.

Another object of the invention is a method for operating an energy system according to the invention, in which the electrical connection between the at least one high-voltage energy storage device and such loads connected to the energy system which are not required during a driving operation of the vehicle are kept interrupted constantly during the driving operation.

In one embodiment of the method, the loads which are not required during driving operations of the vehicle comprise a charging device for charging the at least one high-voltage energy storage device from an external power source. According to the invention, the electrical connection of the charging device with the at least one high-voltage energy storage device is interrupted during driving operations of the vehicle by keeping open the normally open contacts of a contactor. The normally open contacts of the at least one contactor are open in their normal position and closed in their activated position. The normally open contacts of the at least one contactor are only closed during charging operations, when the vehicle is at a standstill and the charging device is connected to an external power source.

One of the advantages of the invention is that no crash-protected installation space is required for high-voltage loads that are not required during driving operations As these loads do not need to be specially protected, weight, installation space and costs of the energy system are reduced, resulting in fewer limitations for the design of the energy system.

Further advantages and designs of the invention follow from the description and the attached drawing.

Needless to say, the aforementioned characteristics, as well as those explained in the following, cannot only be used in the respective combinations listed here, but also in other combinations or individually, without departing from the scope of the present invention.

BRIEF DESCRIPTION OF THE DRAWINGS

The invention is shown schematically in the drawings on the basis of an embodiment and is described further with reference to the drawing. Shown in:

FIG. 1 A schematic representation of an embodiment of the energy system according to the invention.

DETAILED DESCRIPTION

FIG. 1 shows a schematic representation of an embodiment of the energy system 10 according to the invention. A battery housing 12 contains a high-voltage energy storage device 11. A "Battery Junction Box" (BJB) 13 is arranged in the battery housing 12, which BJB is connected to the poles of the high-voltage energy storage device 11. The BJB 13 serves to securely separate the high-voltage energy storage device 11 from the wiring system of the vehicle in case of an accident. For this purpose, two main circuit contactors 17 and 18 are arranged in the electrical lines of the BJB 13, which contactors interrupt the circuit in two places in case of an accident. A fuse 14 protects the circuit against overvoltage and short circuits. In order to avoid voltage peaks when closing the contacts of the contactors 17 and 18, the BJB 13 has a pre-charging circuit with a pre-charge resistor 15 and a contactor 16. Two loads 21 and 22, and a charging device 23, are connected to the BJB 13. The circuit of the charging device 23 contains another contactor 19, which interrupts the circuit of the charging device 23 during driving operations of the vehicle. Thus, the charging device 23 is always at zero potential during driving operations and therefore does not need to be arranged in an accident-protected area of the vehicle nor be specially protected through armoring measures. The contactor 19 is only closed during charging operations. In one embodiment, which is not shown here, the separate intermediate circuit of the charging device 23 has its own pre-charging circuit (not shown here) to close the contactor 19 without load, and has an active discharging system (not shown here) to discharge the intermediate circuit after the contactor 19 is closed.

The invention claimed is:

1. An energy system for a vehicle, comprising: at least one high-voltage energy storage device arranged in a housing, wherein at least one unit which electrically connects the at least one high-voltage energy storage device with loads attached to the energy system is arranged in the housing, and wherein the unit comprises switching devices which are designed to interrupt the circuit between the at least one high-voltage energy storage device and the loads, wherein at least one load which is not active during driving operations of the vehicle is connected to the at least one high-voltage energy storage device via a separate intermediate circuit in the unit containing at least one additional switching device, wherein the at least one additional switching device is designed to keep the separate intermediate circuit interrupted constantly during driving operations.

2. The energy system according to claim 1, wherein the at least one load, which is not active during a driving operation of the vehicle, is a charging device.

3. The energy system according to claim 2, wherein the separate intermediate circuit in the unit comprises a pre-charging circuit, which is designed to bridge the additional switching device before the additional switching device is closed.

4. The energy system according to claim 2, wherein the separate intermediate circuit in the unit comprises a discharging device, which is designed to discharge the separate intermediate circuit after the additional switching device is opened.

5. The energy system according to claim 2, wherein the switching devices comprise contactors.

6. The energy system according to claim 2, wherein the at least one additional switching device comprises at least one contactor.

7. The energy system according to claim 1, wherein the separate intermediate circuit in the unit comprises a pre-charging circuit, which is designed to bridge the additional switching device before the additional switching device is closed.

8. The energy system according to claim 7, wherein the separate intermediate circuit in the unit comprises a discharging device, which is designed to discharge the separate intermediate circuit after the additional switching device is opened.

9. The energy system according to claim 7, wherein the switching devices comprise contactors.

10. The energy system according to claim 7, wherein the at least one additional switching device comprises at least one contactor.

11. The energy system according to claim 1, wherein the separate intermediate circuit in the unit comprises a discharging device, which is designed to discharge the separate intermediate circuit after the additional switching device is opened.

12. The energy system according to claim 11, wherein the switching devices comprise contactors.

13. The energy system according to claim 11, wherein the at least one additional switching device comprises at least one contactor.

14. The energy system according to claim 1, wherein the switching devices comprise contactors.

15. The energy system according to claim 14, wherein the at least one additional switching device comprises at least one contactor.

16. The energy system according to claim 1, wherein the at least one additional switching device comprises at least one contactor.

17. The energy system according to claim 16, wherein the at least one contactor only has normally open contacts.

18. A method for operating an energy system according to claim 1, in which the electrical connection between the at least one high-voltage energy storage device and such loads connected to the energy system which are not required during a driving operation of the vehicle are kept interrupted constantly during the driving operation.

19. The method according to claim 18, in which the loads which are not required during a driving operation of the vehicle comprise a charging device.

20. The method according to claim 19, in which the electrical connection of the charging device with the at least one high-voltage energy storage device is interrupted during driving operations of the vehicle by keeping open the normally open contacts of a contactor.

* * * * *